United States Patent Office 3,540,833
Patented Nov. 17, 1970

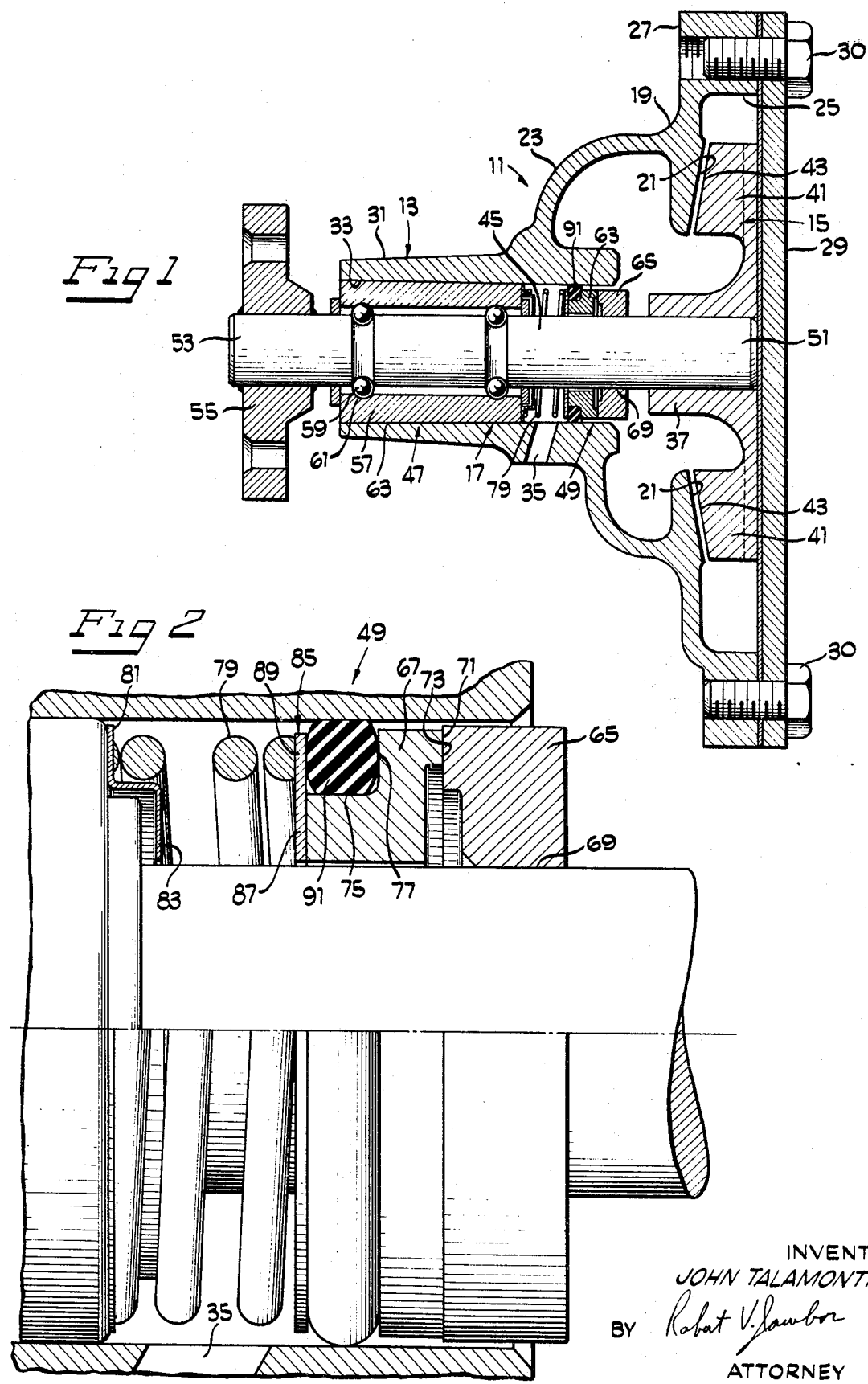

3,540,833
MECHANICAL SEAL
John Talamonti, Chicago Heights, Ill., assignor to Borg-Warner Corporation, Chicago, Ill., a corporation of Delaware
Filed July 1, 1968, Ser. No. 741,373
Int. Cl. F04d 1/00, 29/00; F16j 9/00
U.S. Cl. 415—170                              6 Claims

ABSTRACT OF THE DISCLOSURE

A mechanical face seal which provides a dynamic seal between a rotating shaft and a housing. The seal includes a sealing ring secured to the shaft in spaced relation to a supporting bearing secured to the housing, a relatively stationary seal ring urged into sealing engagement with the rotating ring disposed intermediate the bearing and the rotating ring, a biasing means intermediate the stationary ring and the bearing providing an axial biasing force, and an O ring seal compressed between the housing and the stationary ring to provide a static seal.

BACKGROUND OF THE INVENTION

This invention relates to seals. More particularly it relates to face type mechanical seals.

Face type mechanical seals are widely used in pump applications, such as automotive water pumps, to provide a fluid tight seal between a housing and a relatively rotating shaft. Assembly of such a pump is, in most instances, complicated because of the necessity to accurately control the relationship between the seal components and the pump impeller and the position of the impeller within the pump housing.

Normally, the pump impeller defines one of two relatively rotating sealing surfaces which are maintained in sealing engagement by some form of biasing means to provide a dynamic seal. The biasing means is placed in compression between one of the sealing rings and the pump housing or an element such as a shell pressed into the pump housing to provide the axial load upon the sealing rings. Therefore, the spacing between the sealing surface associated with the impeller and the surface associated with the housing engaged by the biasing means is critical to the biasing load. The impeller therefore must be properly positioned with respect to the seal elements and pump housing to establish the proper biasing load.

In addition to the above, the clearance between the impeller blade edges and the pump housing is critical in that pumping efficiency is determined by accurate control of this spacing. It is impossible to control both of these variables to the optimum degree and impeller placement must be compromised by tolerance matching or other difficult assembly procedures to provide both efficient pump operation and an adequate biasing load.

Another problem encountered in the assembly of such a pump is that usually the seal elements are separate parts and must be properly positioned in surrounding relation to the shaft and fixed within the housing before the impeller can be secured to the pump shaft. This is a particularly undesirable arrangement when the seals are produced in one location or by one manufacturer and assembly of the pump is done at a distance location or by a different manufacturer.

In addition to the above, reworking or rebuilding of the pump after failure of the original seal presents a difficult problem. The sealing face associated with the impeller normally requires machining to restore the worn surface. This in turn changes the dimensional relationship between the impeller blade edges and the sealing surface and consequently the establishment of a proper biasing load and impeller clearance upon reassembly of the pump is further complicated.

Attempts have been made to provide a seal assembly which can be axially pre-loaded independently of the pump impeller. Such seals include a preassembled bearing, seal and shaft arrangement. A separate, rotating sealing ring is secured to the pump shaft which defines one of the sealing faces. A second, stationary ring is disposed between the pump bearing and the ring which is secured to the shaft. The separate stationary ring is urged into sealing engagement with the rotating seal ring by biasing means extending between the sealing ring and the bearing. A rubber boot associated with the biasing means provides a static seal, that is, it prevents leakage between the biasing means and the stationary seal ring and accommodates necessary axial movement of the stationary ring.

This arrangement has not, however, proven to be the ultimate solution. Fluid leaking between the relatively rotating sealing surface or through the boot is directed into the pump bearing by the boot. Contamination of the bearing results causing failure of the bearing and pump shaft. Also, the rubber boot is easily ruptured during assembly and extreme care in handling the combined bearing, seal and shaft is necessary.

Accordingly, it is the principal object of the present invention to provide an improved form of mechanical face seal which may be assembled in operative relation prior to final assembly of the pump. It is another important object of the present invention to provide an improved form of mechanical face seal which may be assembled independently of the pump housing or pump impeller and which eliminates the need for a sealing boot associated with the biasing means to provide a static seal.

Particular objects and advantages of the present invention will become apparent from the following description having reference to the accompanying drawing.

SUMMARY OF THE INVENTION

Very generally, the seal of the present invention includes a pair of relatively rotating sealing rings adapted to provide a dynamic seal between a housing and a relatively rotating shaft. The seal includes biasing means urging the rings into sealing engagement and means to provide a static seal between one of the rings and the housing. The seal is adapted for disposition in surrounding relation to a shaft with one of the rings secured to the shaft in spaced relation to a shaft supporting bearing fixed in the pump housing. The biasing means and the stationary seal ring are disposed intermediate the bearing and the rotating seal ring and the biasing means extends between the bearing and stationary seal ring to urge it into sealing engagement with the rotating seal ring. The static seal is provided by a resilient seal ring which is compressed between the stationary seal ring and the pump housing to prevent leakage of fluid toward the bearing. The housing includes an aperture aligned with the biasing means open to the exterior of the pump to allow fluid leaking through either the static or dynamic seal to escape from the housing before it reaches the bearing area.

DESCRIPTION OF THE DRAWINGS

FIG. 1 is an elevational view, partially in section, of a pump assembly including a bearing illustrative of the features of the present invention.

FIG. 2 is an enlarged view, partially in section, of a portion of the apparatus of FIG. 1 illustrating the bearing arrangement in greater detail.

DETAILED DESCRIPTION

Referring now to the drawings, there is shown a centrifugal pump generally designated 11 which is illustrative of an embodiment of the present invention. The pump includes a housing 13, and an impeller 15, and a shaft, bearing and seal assembly 17.

More particularly, the housing 13 includes a portion 19 which defines a generally bell shaped pumping chamber. A conical wall 21 is provided interiorly of the portion 19 within the pumping chamber area. The portion 19 further defines a fluid inlet scroll 23 and a fluid outlet scroll 25 which include appropriate inlet and outlet openings (not shown).

A bolt flange 27 is provided about the outer periphery of the portion 19 at one end of the housing. A cover plate 29 is secured to the flange 27 in sealing relation by bolts 30. The cover plate is attached after assembly of the pump internal components.

The housing 13 further includes an elongated shaft receiving hub 31 which defines an elongated bore 33 communicating with the pumping chamber. The hub is provided with an aperture 35 which extends generally transversely of the bore 33 and communicates between the bore and the exterior of the housing.

The impeller 15 is rotatably supported in the pumping chamber of the housing 13 by the shaft, bearing and seal assembly 17. The impeller which is of the axial inflow-radial outflow type includes a central hub 37 which receives the shaft assembly 17. The impeller is provided with a plurality of pumping vanes 41 including edges 43 disposed in closely spaced relation to the conical wall 21 of the housing 13. The clearance between the edges 43 and the conical wall 21 must be carefully controlled to insure efficient pumping operation.

The shaft, bearing and seal assembly 17 includes a shaft 45, a bearing arrangement 47, and a seal assembly 49.

The shaft 45 is rotatably supported in the bore 33 of the hub 31 of the pump housing 13 by the bearing arrangement 47. The shaft includes an end 51 disposed in the pumping cavity. The impeller 15 is secured to the end 51 by a press or interference fit within the hub 37.

An opposite end 53 of the shaft extends outwardly of the housing and includes a bolt flange 55. The bolt flange is adapted to be connected to a pulley or the like (not shown) which may be driven by a power source to cause pumping of the fluid in the pumping cavity. Conventionally, the bolt flange is secured to the shaft end 53 by welding or other permanent connection. This is done prior to assembly of the shaft with other of the pump components. Since the flange is of a diameter which is larger than the diameter of the bore 33 installation of the shaft into the pump housing must be accomplished from the hub end, consequently, the impeller 15 must be pressed into the end 51 of the shaft after the shaft has been positioned in the pump housing.

The bearing arrangement 47 includes elongated outer race 57 and two rows of ball bearings 59 which are disposed in appropriately formed grooves in the pump shaft 45. The outer race is also grooved as at 61 to receive the balls 59. This relationship allows the bearing to absorb thrust loading and prevents any substantial relative axial movement between the shaft and the outer race. The outer race 57 includes an outer cylindrical surface 63 which is pressed into the bore 33 of the pump housing and held in place by a snap ring to retain the assembly 17 in its proper location in the pump housing.

The seal assembly 49 is disposed in surrounding relation to the shaft 45 within the bore 33 of the pump housing 13. As best seen in FIG. 2, the seal assembly 49 includes a rotatable seal ring 65 made of steel or the like associated with the shaft 45 and an axially movable essentially non-rotatable or stationary seal ring 67 made of carbon, plastic, or other suitable material associated with the housing 13. Both rings have a diameter slightly smaller than the diameter of the bore 33 of the housing hub 31.

The seal ring 65 is generally annular and includes a central bore 69 sized to fit tightly upon the shaft 45 to form a seal between the shaft and the ring and to retain the ring in its proper position upon the shaft. Alternately, other means such as an "O" ring contained in an appropriate groove within the ring 65 may be used to fix the ring to the shaft. The ring 65 also includes a radial sealing face 71 which is in sliding engagement with the sealing ring 67 to provide a dynamic seal between the shaft and housing.

The non-rotating seal ring 67 is also generally annular and includes a central bore surrounding the shaft 45. The central bore is larger than the diameter of the shaft and allows free rotational movement of the shaft with respect to the seal ring. The ring 67 further includes a radial sealing face 73 at one end disposed in sealing engagement with the face 71 of the rotating ring 65.

An opposite end of the annular ring 67 includes a peripheral groove defined by an axial wall 75 and a radial wall 77.

The seal rings 65 and 67 are maintained in sealing engagement to provide a dynamic seal by a biasing means 79 in the form of a compressed coil spring interposed between the stationary or non-rotatable ring 67 and an end of the bearing outer race 57. A ring or ferrule 81 is disposed between the end of the bearing outer race and the spring 79 which includes an inwardly directed flange 83 terminating in closely spaced relation to the shaft 45. This flange acts as a deflector for leaking fluid and other foreign matter and prevents movement of such contaminants into the bearing area.

A generally annular radially directed plate 85 is disposed intermediate the spring 79 and the stationary sealing ring 67. This plate includes a contacting portion 87 engaging the end of the seal ring 67 to transmit the force of the biasing spring to the seal ring and a retaining portion 89. A first side of the retaining portion 89 is contacted by the spring 79 and receives the axial biasing force which is in turn transmitted to the non-rotating seal ring. An opposite side is disposed in spaced relation to the radial wall 77 of the seal ring 67 and defines a wall of the groove formed in the ring 67.

An O ring seal 91 is disposed in the groove formed in the non-rotating sealing ring 67. This "O" ring is sized to be compressed between the internal bore 33 of the housing hub 31 and the axial wall 75 and also between the radial wall 77 and the retaining portion 89 of the plate 85. This relationship provides a static seal which prevents fluid leakage along the bore 33 and in addition provides a counteracting force upon the seal ring 67 to prevent rotation due to force transmitted through the relatively rotating sealing faces 71 and 73.

The seal arrangement described provides both a dynamic seal between the housing 13 and the relatively rotating pump shaft 45 and static seals between the housing 13 and the stationary seal ring 67 and the shaft 45 and the rotating ring 65. The fluid pumped is therefore completely retained within the pumping chamber 19 and prevented from escaping along the shaft 45. Should leakage occure between the relatively rotating sealing faces 71 and 73 or between the O ring 91 and the housing bore 33 or between the ring 65 and shaft 45, the inwardly directed flange 83 prevents entry of the fluid into the bearing area. Leaking fluid within the bore 33 is directed to the exterior of the pump by the aperture or "weep hole" 35 preventing premature failure of the bearing.

Assembly of the seal can be readily accomplished prior to installation of the bearing, shaft and seal assembly 17 into the pump housing. The bearing outer race 57 and balls 59 are first positioned upon the shaft 45. The ring or ferrule 81, spring 79, plate 85, O ring 91 and stationary seal ring 67 are then positioned in surrounding relation to the shaft intermediate the bearing arrangement 47 and the shaft end 51. The rotating sealing ring 65 is then pressed or otherwise secured to the shaft in proper spaced relation to the bearing outer race. The spring 79 is thereby compressed to urge the relatively rotating sealing faces 71 and 73 into sealing engagement. Simultaneously, the "O" ring 91 is compressed into sealing engagement with the portion 89 of the plate 85 and the radial wall 77 of the stationary sealing ring.

As can be seen, spring preload is accurately established independently of the impeller 15 and therefore an optimum biasing force may be established.

The bearing outer race 67 is then pressed into the bore 33 of the pump housing 13. During this pressing operation the O ring is pressed into sealing engagement with the axial wall 75 of the stationary sealing ring 67 and with the bore 33 of the housing hub 31 to provide a static seal between these elements.

Thereafter, the impeller hub 37 is pressed onto the end 51 of the shaft 45. The impeller is accurately positioned with respect to the housing portion 19 to establish optimum spacing between the conical wall 21 and the impeller blade edges 43 to provide efficient pump operation. This procedure does not in any way affect the seal preload.

Should it become necessary to rebuild the seal, new elements may be easily installed and positioned to provide an optimum sealing preload and the impeller reinstalled to provide optimum sealing effifficiency, Also, the complete shaft, bearing and seal assembly 17 may be assembled prior to installation into a pump. This assembly may then be utilized at distant locations to complete a pump structure.

Various features of the invention have been particularly shown and described in connection with the illustrated embodiment of the invention. However, it must be understood that these particular arrangements merely illustrate and that the invention is to be given its fullest interpretation within the terms of the appended claims.

What is claimed is:

1. A pump comprising: a housing defining a pumping chamber including a fluid inlet and a fluid outlet, and an elongated unitary hub having an axial bore therethrough, a rotatable impeller disposed in said pumping chamber to pump fluid from said inlet to said outlet, and a shaft, bearing and seal assembly disposed within said bore of said housing hub, said shaft including an end extending outwardly of said housing and an end secured to said impeller, said bearing supporting said impeller within said bore and including an outer race secured to said hub bore, said seal including a rotatable sealing ring secured to said shaft in spaced relation to said bearing outer race, said rotatable sealing ring adapted to be selectively axially adjusted with respect to the position of said outer race during the assembly of said pump, a relatively stationary sealing ring surrounding said shaft intermediate said outer race and said rotatable sealing ring, said rings including contacting sealing faces in essentially fluid tight sealing engagement, said seal further including biasing means compressed between said outer race and said stationary seal ring urging said ring into sealing engagement with said rotatable ring, and an O ring seal compressed between said stationary ring and said internal bore to provide a static seal therebetween.

2. A pump as claimed in claim 1 wherein said housing includes an aperture communicating between the exterior of said housing and said bore intermediate said bearing outer race and said seal rings.

3. A pump as claimed in claim 1 wherein said relatively stationary sealing ring includes a peripheral groove adjacent said biasing means defined by a generally axial wall and a generally radial wall, said O ring being disposed within said groove and being compressed between said bore and said axial wall and radial wall.

4. A pump as claimed in claim 3 wherein said seal includes a generally radially directed annular plate intermediate said biasing means and said relatively stationary sealing ring, said plate including a contacting portion defining a wall of said groove and said O ring being compressed between said contacting portion and said radial wall and between said housing bore and said axial wall.

5. A pump as claimed in claim 4 wherein said seal includes a ferrule disposed intermediate said bearing outer race and said biasing means, said ferrule including an outer annular portion adapted to abut said bearing outer race and a radially inwardly directed flange portion substantially perpendicular to said shaft and terminating in closely spaced relation to said shaft.

6. A method of assembly of a pump comprising a housing defining an elongated bore, a shaft, bearing and seal assembly including an elongated rotatable shaft, a bearing for supporting said shaft having an outer race adapted to be fixed in a housing, a seal including a rotatable sealing ring selectively axially adjustable with respect to said outer race, a relatively stationary sealing ring, biasing means, an O ring seal and an impeller, the steps of the method comprising: securing said supporting bearing including said outer race to said shaft, positioning said biasing means in surrounding relation to said shaft with an end thereof contacting said outer race, connecting said O ring seal to said relatively stationary sealing ring adjacent the outer periphery thereof, positioning said relatively stationary sealing ring in surrounding relation to said shaft in contact with said biasing means, pressing said rotatable sealing ring onto said shaft into contact with said relatively stationary sealing ring, selectively adjustably axially positioning said rotatable ring with respect to said bearing outer race to compress said biasing means between said outer race and said relatively stationary sealing ring to urge said sealing rings into essentially fluid tight sealing engagement, inserting said assembled shaft bearing and seal assembly into said pump housing, inserting said bearing outer ring into said bore of said pump housing, pressing impeller onto said shaft and positioning said impeller with respect to said housing.

References Cited

UNITED STATES PATENTS

| | | | |
|---|---|---|---|
| 2,249,930 | 7/1941 | Bailey et al. | 103—111 |
| 2,452,261 | 10/1948 | Roberts | 103—111 |
| 2,542,902 | 2/1951 | Chubbuck | 103—111 |
| 2,554,536 | 5/1951 | Miller | 103—111 |
| 3,079,605 | 2/1963 | Thomas et al. | 277—61 |
| 2,250,714 | 7/1941 | La Bour | 103—111 |
| 2,347,386 | 4/1944 | Adams | 103—111 |
| 2,363,110 | 11/1944 | Krug | 277—38 |
| 2,444,713 | 7/1948 | Solari. | |
| 2,549,112 | 4/1951 | Miller. | |
| 2,561,132 | 7/1951 | Payne. | |
| 2,571,035 | 10/1951 | Hastings. | |
| 2,624,600 | 1/1953 | Voytech. | |
| 2,653,837 | 9/1953 | Voytech | 277—93 |
| 3,157,404 | 11/1964 | Doble. | |
| 2,405,464 | 8/1946 | Storer | 277—38 |

FOREIGN PATENTS 635,324   3/1962   Italy.

HENRY F. RADUAZO, Primary Examiner

U.S. Cl. X.R.

277—61, 415—173